United States Patent [19]

Wilson et al.

[11] Patent Number: 5,204,070
[45] Date of Patent: Apr. 20, 1993

[54] REACTOR FOR PROCESSING A CATALYST MATERIAL

[75] Inventors: Michael F. Wilson, Ottawa; Thomas M. Steel, Waterloo; Walter W. Duley, King City, both of Canada

[73] Assignee: Her Majesty the Queen in right of Canada, as represented by the Minister of Energy, Mines and Resources Canada, Ottawa, Canada

[21] Appl. No.: 770,858

[22] Filed: Oct. 3, 1991

[30] Foreign Application Priority Data

May 16, 1991 [CA] Canada .................................. 2042801

[51] Int. Cl.⁵ .......................... B01J 19/08; B01J 37/34
[52] U.S. Cl. ................................ 422/186; 204/157.41; 502/5; 502/34; 502/20
[58] Field of Search ............... 502/20, 34, 5; 422/186; 204/157.41

[56] References Cited

U.S. PATENT DOCUMENTS

| | | | |
|---|---|---|---|
| 2,758,098 | 8/1956 | Haensel | 502/34 |
| 3,575,669 | 4/1971 | Haeff | 331/94.5 |
| 4,012,301 | 3/1977 | Rich et al. | 204/157.1 R |
| 4,124,466 | 11/1978 | Morrey | 204/157.1 R |
| 4,144,189 | 3/1979 | Kirkbride | 252/414 |
| 4,551,437 | 11/1985 | Berrebi | 502/5 |
| 4,970,397 | 5/1992 | Green et al. | 250/341 |
| 5,037,785 | 8/1991 | Wilson et al. | 502/5 |

FOREIGN PATENT DOCUMENTS

| | | |
|---|---|---|
| 0202911 | 11/1986 | European Pat. Off. . |
| 2542631 | 3/1983 | France .................................. 502/20 |
| 242735 | 12/1988 | Japan .................................... 502/20 |
| 0107227 | 5/1991 | PCT Int'l Appl. . |

OTHER PUBLICATIONS

Oxidative Regeneration of Hydrotreating Catalysts, Dec. 20, 1985, 157–171; Applied Catalysis, 23 (1986).
Characteristics of a Commercially Aged Ni-Mo/A1203 Hydrotreating Catalyst: Component Distribution, Coke Characteristics, and Effects, Dec. 1986, 220–230; Ind. Eng. Chem. Prod. Res.
Effect of Oxygen Concentration on Temperature Runaway During Regeneration of Hydrotreating Catalyst, Jun. 10, 1988, 189–198; Applied Catalysis, 44 (1988).

Primary Examiner—Donald P. Walsh
Assistant Examiner—Daniel Jenkins
Attorney, Agent, or Firm—McAndrews, Held & Malloy, Ltd.

[57] ABSTRACT

A reactor for processing a catalyst material comprises a reaction chamber including a support for the catalyst material. A laser radiation entry means, a gas inlet and an exhaust are provided, each in communication with the reaction chamber. The gas inlet permits entry in the chamber of an oxidizing gas which assists in processing the catalyst material when exposed to laser radiation entering the chamber. Any resulting exhaust gases are then removed from the chamber through the exhaust. A drive means is provided to move the support in a manner such that the catalyst is moved through the laser radiation. The apparatus is useful in reactivate deactivated catalysts, such as hydroprocessing catalysts.

16 Claims, 7 Drawing Sheets

REACTOR FOR PROCESSING A CATALYST MATERIAL

FIELD OF THE INVENTION

The present invention relates to a reactor for processing a catalyst material. Specifically, an aspect of the present invention relates to a reactor for reactivating a catalyst material in which the catalyst material is passed through at least one zone in the reaction chamber where it is exposed to laser radiation in the presence of an oxidizing gas.

BACKGROUND OF THE INVENTION

The use of hydroprocessing catalysts in the petroleum industry is known and well documented. Generally, hydroprocessing catalysts encompass both hydrotreating and hydrocracking catalysts. Typically, hydrotreating catalysts are utilized to facilitate removal of organosulphur and nitrogen compounds from refinery feedstocks as a treatment step prior to quality assessment of the final fuel product. Similarly, hydrocracking catalysts may be used in processes for converting gas oils to transportation fuels and for refining lube oils. The cost associated with these catalysts (i.e. the cost of obtaining/purchasing and of using the catalysts) represents the major cost associated with the conversion of primary hydrocarbons to refined fuel products.

Hydroprocessing catalysts generally comprise molybdate and/or tungstate catalysts promoted by nickel and/or cobalt and supported on an inert material, usually gamma alumina. Typically, commercial hydroprocessing catalysts are prepared by supporting the active metal oxides (e.g. $MoO_3$, $WO_3$) on $\gamma$-$Al_2O_3$. This supporting process may involve successive impregnation/calcination steps followed by promotion with CoO or NiO. After loading into a reactor, the catalysts are activated for hydroprocessing operations by a sulphidation step which serves to convert the supported metal oxide-based catalyst to the more stable metal sulphide-based (e.g. $MoS_2$, $WS_2$) catalyst. During hydroprocessing, the catalyst activity is usually sustained by the presence of organosulphur compounds in the feedstocks. These compounds supply sulphur to the catalyst through hydrogen sulphide ($H_2S$) formation.

As the price of crude oil has declined in recent years, petroleum refiners, in general, and synthetic crude oil producers, in particular, have been devoting considerable effort toward developing techniques by which process efficiency will be increased and/or overall process costs will be decreased.

Consideration has been given to developing processes for regenerating deactivated or spent hydrotreating catalysts. Bogdanor et al (*Ind. Eng. Chem. Prod. Res. Dev.* 1986, 25, 220-230) teach that deactivation of hydrotreating catalysts occurs in at least four different ways:

(i) fouling by deposition of coke, ash and metals;
(ii) sintering of the support with consequent loss of surface area;
(iii) agglomeration of active metals; and
(iv) poisoning of active sites on catalysts (usually by metals contained in feedstock).

Of these, it is believed that fouling is the major cause of deterioration in catalyst performance. Fouling involves the deposition of carbonaceous matter (usually referred to as coke) on the catalyst surface. This has at least two deleterious results: (a) physical blockage of the catalytically active surface sites and, on a larger scale, (b) plugging of catalyst pores such that diffusion of the feedstock through the pores to the active sites is impeded. Coke fouling of catalytic sites usually occurs via adsorption of certain molecular species (referred to as coking precursors) which are bound strongly to the sites and may be easily polymerized and/or condensed to form large molecular structures.

Excessive operating temperatures may cause sintering and/or agglomeration of hydrotreating catalysts through crystal growth. Sintering is an irreversible phenomenon whereas redispersion of agglomerated metals is practised industrially.

Catalyst poisoning by metals usually involves contamination of the active sites by, for example, lead, arsenic and sodium contained in the feedstock being treated. Catalyst poisoning differs from fouling in that the former represents a chemical interaction of the feedstock material with the catalyst surface whereas the latter is a physical phenomenon.

Some of the largest producers of synthetic crude oil may be found in Alberta, Canada. Since hydroprocessing operations in synthetic fuels production involves exposing the catalyst to more severe operating regimes than those used in conventional crude oil refining processes, the hydroprocessing catalysts used by synthetic fuel producers may be considered as a higher risk investment. Upgraded bitumen from fluid and delayed coking operations usually requires hydrotreating prior to blending of distillate streams and pipelining as synthetic crude oil. In such a case, the hydrotreating processes may be used to remove sulphur and nitrogen heteroatoms, and to saturate olefins and some aromatics in naphtha and gas oil coker distillates. Alternatively, the catalyst may be used in refinery hydrocracking operations for upgrading synthetic crude gas oils and lube oils. In such a case, more severe reaction conditions are required with the result that the catalysts may experience considerable fouling (i.e. coking) during the operating cycle.

Generally, efficient and successful operation of a commercial hydroprocessing unit involves maintenance of maximum feedstock conversion levels throughout the lifetime of the active catalyst. As the catalyst slowly deactivates, the process temperature is systematically ramped upwardly until the catalyst activity is substantially exhausted—i.e. the catalyst is deactivated or spent. If the appropriate precautionary steps are taken, the catalyst will be reversibly deactivated—i.e. it will be fouled. In this type of operating cycle, catalyst lifetime will typically vary from six to eighteen months depending on feedstock composition and operating conditions. Generally, hydroprocessing light petroleum fractions permits a longer catalyst lifetime when compared to hydroprocessing heavy gas oils. The frequency of reactor downtime is related to the activity and/or the lifetime of the catalyst and to the composition of the feedstock material.

Fouled hydroprocessing catalysts may be regenerated by burning off surface carbon via an oxidative regeneration process. Typically, such a regeneration process involves reaction of the deactivated catalyst in the presence of an oxidizing air stream (usually air or air diluted with nitrogen) in a high temperature furnace.

Furimsky (*Applied Catalysis*, 44 (1988) 189-198) teaches that catalysts used to hydrotreat light or medium distillate fractions may be regenerated to a greater extent than catalysts used to treat heavy residues. Moreover, this reference teaches that, in a conventional catalyst regeneration process (i.e. high temperature burnoff), the initial contact between the coke molecules on the catalyst surface and the oxidizing medium may result in uncontrollable overheating and possibly sintering of the catalyst. This should be avoided as it can result in permanent and undesirable changes to the catalyst rendering it unusable.

Yoshimura and Furimsky (*Applied Catalysis*, 23 (1986) 157–171) teach that, in conventional oxidative catalyst regeneration processes, temperatures as high as 500° C. may be required to burn off the carbonaceous material from the catalyst surface. The potential problems associated with exposing hydrotreating catalysts to high temperatures is discussed above.

U.S. Pat. No. 2,758,098 (*to Universal Oil Products Company*) teaches a process for regeneration of platinum-containing catalysts which have been rendered relatively inactive as a result of use in a hydrocarbon conversion process. Generally, the process encompasses periodically contacting the spent catalysts with carbon dioxide at temperatures of from 1100° to 1400° F. (from 594° to 760° C.) for a period of time sufficient to render the catalyst active. It is interesting to note that the residence time required to regenerate the catalyst utilizing the subject process is on the order of one hour or more. Essentially, this reference teaches a conventional high temperature, long residence time, oxidative catalyst regeneration process. Notwithstanding the required residence time (which decreases efficiency of the regeneration process), the disadvantage of exposing catalysts to high temperatures is discussed above.

It should be appreciated that conventional high temperature oxidative catalyst regeneration process generally do not result in restoration of the catalyst to the original level of activity. After each time the catalyst is regenerated, the restored catalyst can usually only be used for a shorter period of time before requiring further regeneration. It is likely that this due to an unavoidable degree of sintering of the catalyst which is associated with many conventional high temperature oxidative regeneration processes. Thus, using such a process to regenerate the catalyst results in a definite limit of catalyst lifetime.

In U.S. Pat. No. 5,037,785, assigned to the Assignee of the instant application and the contents of which are hereby incorporated by reference, there is disclosed a process for regeneration of a deactivated hydroprocessing catalyst. The process comprises exposing the catalyst to laser radiation in the presence of an oxidizing gas. The process may be used to regenerate supported or unsupported metal catalysts which have been fouled by coking.

In processing catalyst material, such as regeneration of a deactivated hydroprocessing catalysts, using laser radiation in the presence of an oxidizing gas, it would be desirable to have an apparatus adapted to carry out the process in a relatively simple and efficient manner.

SUMMARY OF THE INVENTION

It is an object of the present invention to provide a novel reactor for processing a catalyst material.

It is another object of the present invention to provide a novel reactor for continuous processing of a catalyst material.

It is another object of the present invention to provide a novel reactor for processing of a catalyst material in such a manner that the occurrence of catalyst overheating, and the subsequent occurrence of sintering and/or agglomeration, is minimized or substantially eliminated.

Accordingly, in one of its aspects, the present invention provides a reactor for processing a catalyst material comprising:

- a reaction chamber including support means for the catalyst material;
- at least one laser radiation entry means in communication with the reaction chamber to permit laser radiation to enter the chamber at a first zone thereof and impinge on the support means;
- at least one gas inlet in communication with the reaction chamber and permitting entry of an oxidizing gas into the reaction chamber;
- at least one exhaust outlet in communication with the reaction chamber at a second zone thereof different from said first zone and permitting removal of an exhaust gas from the reaction chamber; and
- drive means operable to provide relative movement between the support means and the laser radiation entry means to allow the support means to be positioned in one of the zones.

The catalyst material is preferably a hydroprocessing catalyst. As used throughout this specification, the term "hydroprocessing catalyst" is meant to encompass catalysts which are susceptible to deactivation by coke fouling. Nonlimiting examples of such catalysts are those used for hydrotreating (hydrodesulphurization, hydrodenitrogenation, and hydrogenation of olefins and aromatics), hydrocracking, gasoline reforming, selective hydrogenation of pyrolysis gasolines, and those used as molecular sieves. The present reactor may also be used to investigate and optimize restructuring surface effects of the catalyst material such as metal agglomeration, calcining and sintering.

The hydroprocessing catalyst material suitable for use is one which has been partially or substantially deactivated by fouling. The choice of hydroprocessing catalyst material is not particularly restricted. Many hydroprocessing catalyst materials are available commercially. The preferred catalysts include supported metals or metal sulphides, on a suitable support material (this support material should not be confused with the support means of the present laser reactor). Suitable metal sulphides include molybdenum and tungsten sulphides, preferably promoted by sulphides of cobalt or nickel. Non-limiting examples of suitable metals include iron, chromium cobalt, nickel, ruthenium, rhodium, palladium, iridium, rhenium and platinum. Non-limiting examples of suitable support materials include alumina, silica, silica-alumina, titania and cerium oxide - the preferred support material is alumina.

The present reactor can be used to remove a substantial amount of the carbonaceous material (e.g. coke) from the surface of the catalyst material via photo-thermally induced chemical reaction of the material with an oxidizing gas. This results in a minimum of sintering and/or agglomeration of the catalyst.

The deactivated hydroprocessing catalyst material is typically in the form of particles and may comprise extrudates, spheres, trilobes or quadrilobes. Alternatively, the catalyst material may be of the type which is deposited on or adhered as a coating to the surface of a substrate. For example, the catalyst may form a thin coating (e.g. from 10 to 100 $\mu$m) on a flat metal substrate.

The type of laser radiation used with the present apparatus is not particularly restricted provided that the radiation is absorbed by the catalyst material to be processed. For example, the laser radiation may be generated from a laser of the $CO_2$, YAG or Excimer variety. Preferably, the radiation is generated from a $CO_2$ laser. The laser radiation may be pulsed, continuous wave or pulsed-continuous wave. Preferably, the laser radiation is pulsed-continuous wave.

BRIEF DESCRIPTION OF THE DRAWINGS

A preferred embodiment of the present invention will now be described, by way of example only, with reference to the attached drawings, in which.

DETAILED DESCRIPTION OF THE INVENTION

Figure 1:
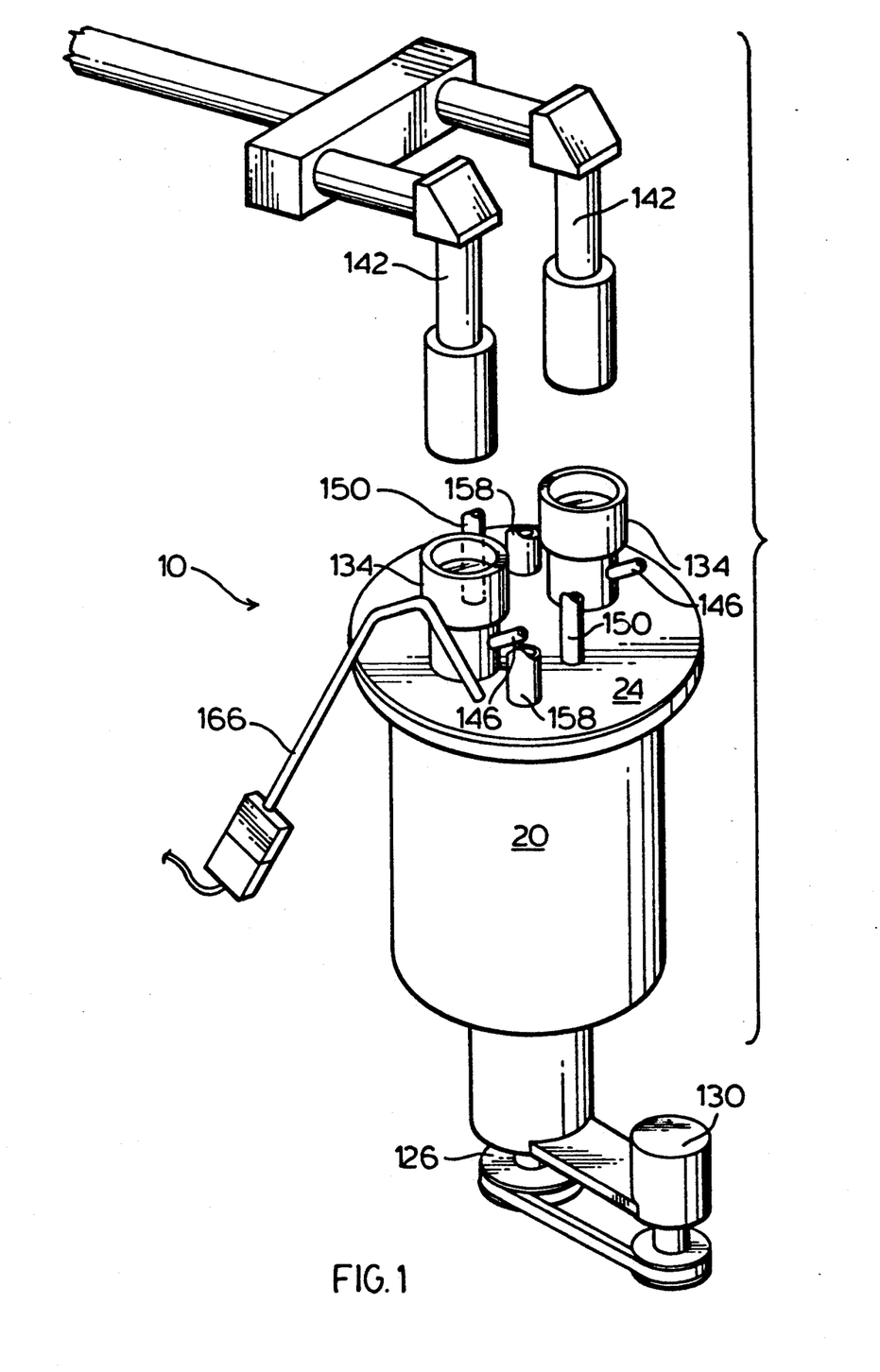
FIG. 1 illustrates a perspective view from above of a reactor and a portion of a laser radiation source.
Figure 2:
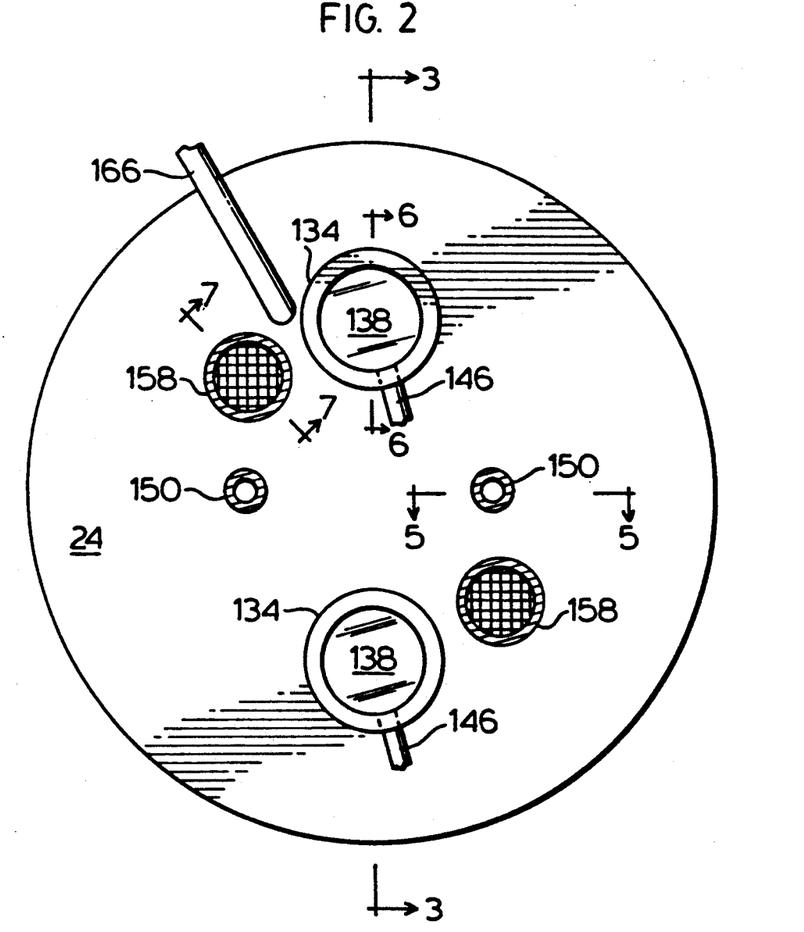
FIG. 2 illustrates a top plan view of the reactor of FIG. 1.
Figure 3:
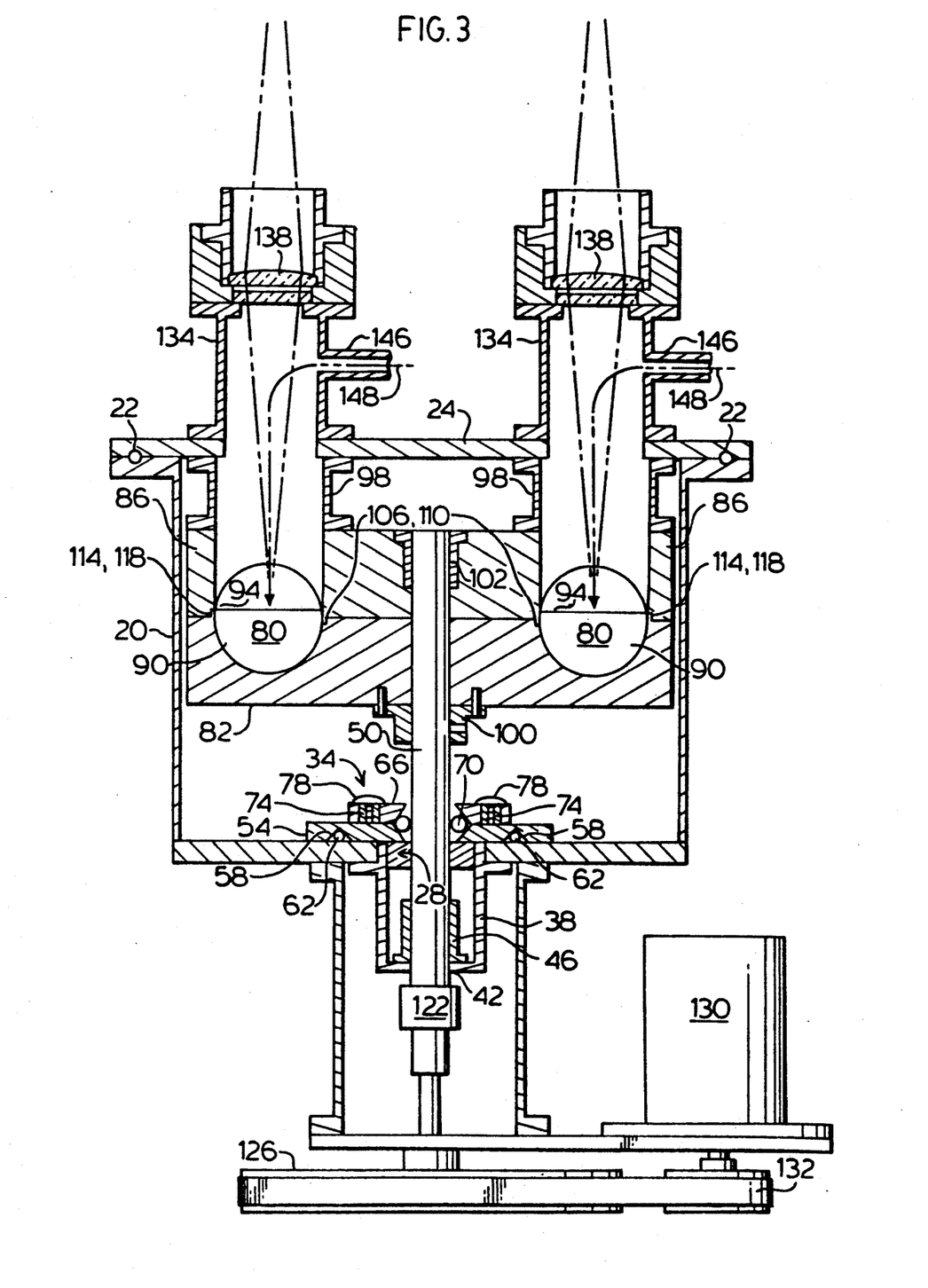
FIG. 3 is a section taken along the line 3—3 of FIG. 2.

With reference to FIGS. 1 through 3, a reactor is shown generally at 10. The reactor includes a cylindrical tub 20 and a lid 24, each of which may be fabricated from any suitable material such as stainless steel. Lid 24 may fastened to tub 20 with any suitable fastening means (not shown) and an O-ring 22, or other suitable gasket, may be provided to seal the tub 20 to the lid 24.

Tub 20 includes an aperture 28 about which a seal assembly 34 is positioned. A cylindrical bearing housing 38 is attached to and extends below the exterior of the bottom of tub 20 and has an aperture 42 through its bottom face disposed in a manner such that aperture 42 is coaxial with aperture 28.

A bearing 46, fabricated from a suitable material such as glass and teflon, is mounted to housing 38 and rotatably receives a shaft 50 which extends from beneath housing 38 through bearing 46 and seal assembly 34 and into the interior of tub 20.

Seal assembly 34 includes an annular base plate 54 with a central opening and an annular recess 58 on its lower surface which receives an O-ring 62. Base plate 54 is fastened to tub 20 by any suitable fastening means (not shown) with its center opening aligned with aperture 28 and such that O-ring 62 is compressed between plate 54 and tub 20 to form a seal therebetween. An annular top plate 66 including a center aperture is mounted on top of base plate 54 and the edge of the central aperture of top plate 66 cooperates with the edge of the center opening of base plate 54 to maintain an O-ring 70 in place about the shaft 50. The center aperture of top plate 66 and O-ring 70 are configured to provide a sealing engagement with shaft 50 while allowing it to rotate.

The diameter of the center aperture of base plate 54 is somewhat greater than that of shaft 50 and top plate 66 includes holes 74 through which fastening means 78, such as screws, pass to engage base plate 54. The diameter of the portion of fastening means 78 which passes through holes 74 is smaller than the diameter of the holes 74, and this allows top plate 66 to slide upon base plate 54 to accommodate any small amount of eccentricity in the rotation of shaft 50 while still maintaining a sealing engagement.

It should be understood that while O-ring 22 and seal assembly 34 result in the assembly of tub 20 and lid 24 being substantially airtight, this is not essential to the operation of reactor 10. It is however contemplated that such an airtight assembly could be desirable in certain circumstances.

A torroidal reaction chamber 80 is defined within tub 20 by a turntable 82 and a cap 86. Turntable 82 has an annular channel 90 in its upper surface which constitutes the bottom half of the reaction chamber torus and cap 86 has a similar annular channel 94 in its lower surface which constitutes the upper half of the reaction chamber torus. Channel 90 acts as a support means for particulate catalyst within the reaction chamber 80. It will be apparent to those of skill in the art that the reaction chamber is not required to be torroidal in shape and could be any other suitable shape, although it has been found that the torroidal shape is advantageous, as will be apparent later.

Figure 4:
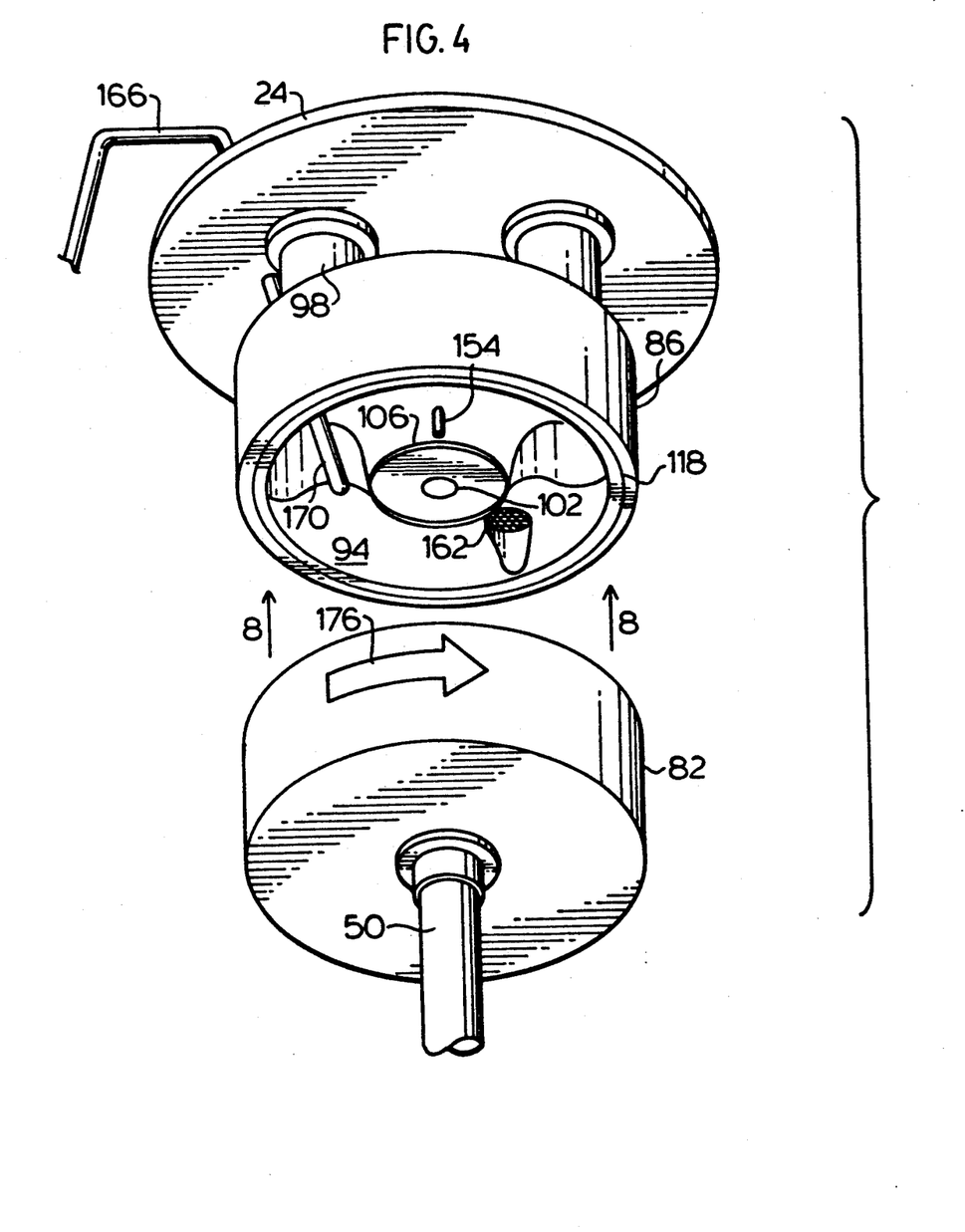
FIG. 4 illustrates an exploded perspective view from below of a portion of the reactor of FIG. 1.

With reference to FIG. 4, cap 86 is fixedly mounted beneath lid 24 by hollow cylindrical towers 98, as will be described in more detail hereinafter. Turntable 82 is mounted to shaft 50 by collar 100 such that turntable 82 rotates with shaft 50. The upper end of shaft 50 extends above turntable 82 and is received in a bearing 102 in cap 86, bearing 102 being fabricated of any suitable bearing material, such as glass and teflon.

Figure 5:
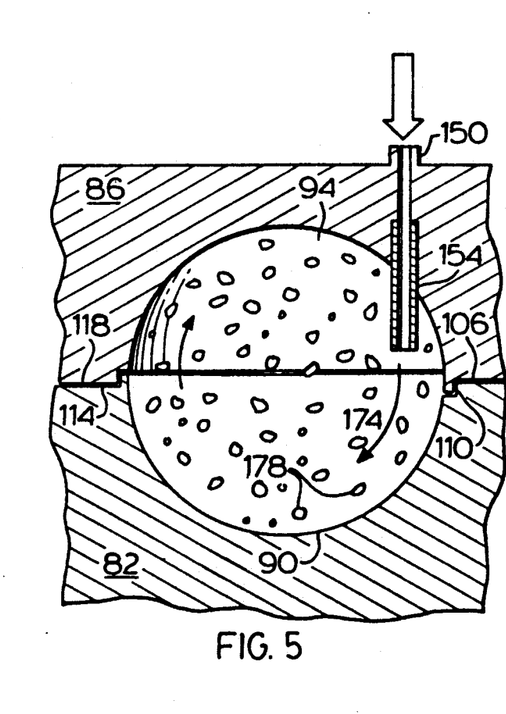
FIG. 5 is a partial section taken along the line 5—5 of FIG. 2.
Figure 6:
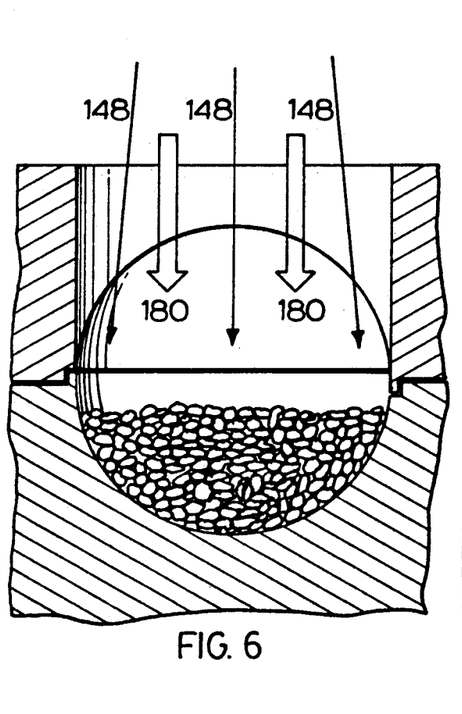
FIG. 6 is a partial section taken along the line 6—6 of FIG. 2.
Figure 7:
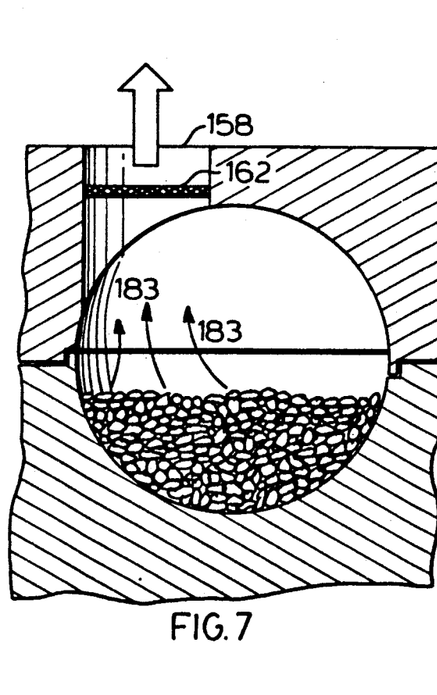
FIG. 7 is a partial section taken along the line 7—7 of FIG. 2.

With reference to FIGS. 5 through 7, cap 86 has an annular boss 106 about its center, located radially inward from channel 94. A groove 110, complementary to boss 106, is formed in turntable 82. In a similar fashion, turntable 82 has an annular boss 114 about its center, located radially outward from channel 90, and cap 86 has a complementary groove 118 formed therein. When cap 86 is assembled with turntable 82 to form the torroidal reaction chamber 80, boss 106 is received in groove 110 and boss 114 is received in groove 118.

The lower end of shaft 50 is received in a coupling 122 which in turn is attached to a drive pulley 126. The coupling 122 is keyed to shaft 50 so that rotation of coupling 122 leads to rotation of shaft 50 and turntable 82. A motor 130, which may be any suitable speed controlled motor such as a stepper motor, drives a belt 132 which is attached to pulley 126 and thus rotates the assembly of coupling 122, shaft 50 and turntable 82, as desired.

As mentioned hereinabove, cap 86 is mounted to lid 24 by hollow cylindrical towers 98. These towers are in communication with channel 94, and hence the interior of the torroidal reaction chamber 80, and are aligned with apertures through lid 24 and with hollow turrets 134 which are mounted to the top of lid 24.

Each turret 134 includes an optical assembly of one or more lenses 138. A source of laser radiation 142 of a suitable wavelength is positioned above each turret 134. The focal point, shape and transmission characteristics of lenses 138 are selected, in a manner well known to those of skill in the art, so that the laser radiation is directed through turrets 134, lid 24, tower 98 and cap 86 into the interior of reaction chamber 80 and impinges onto channel 90.

Each turret 134 further includes an inlet 146 for an oxidizing gas. When a pressurized oxidizing gas is admitted to a turret 134 through inlet 146, the gas passes beneath lenses 138 and down through the interior of the turret 134 and tower 98 into the reaction chamber 80 as indicated by arrows 148 in FIGS. 3 and 6.

With reference to FIGS. 2 and 5, a second pair of oxidizing gas inlets 150 are provided through lid 24. Inlets 150 are spaced approximately 90 degrees from turrets 134 (when lid 24 is viewed from above—see FIG. 1). Each inlet 150 provides a gas conduit through lid 24 and into cap 86 where it connects to a vertically mounted gas jet 154 which extends down from cap 86 at the inner radial periphery of channel 94 of reaction chamber 80.

With reference to FIGS. 2 and 7, a pair of exhaust outlets 158 are disposed in proximity to turrets 134 (when lid 24 is viewed from above-see FIG. 2). Each exhaust outlet 158 provides a conduit through lid 24 and into cap 86 where it enters the outer radial periphery of channel 94 of reaction chamber 80 in a substantially vertical manner. One or more appropriately sized mesh filter screens 162 cover the entry point to the exhaust outlet 158 to prevent air borne particulate material in the reaction chamber from entering the exhaust outlet 158.

Each adjacent combination of gas inlet 146, turret 134 and exhaust outlet 158 is considered to constitute a processing stage. It will apparent to those of skill in the art that the number of processing stages in the reactor may be increased or decreased as desired, with the relative spacing between the components of each stage being adjusted as required.

In order to monitor the temperature of the reaction chamber 80, a thermocouple 166 is provided and passes through lid 24 and cap 86 so that the sensing end 170 of the thermocouple 166 protrudes into reaction chamber 80.

In use, lid 24 and tub 20 are disassembled and a catalyst material, preferably in particulate form, to be treated is loaded into channel 90. The amount of catalyst to be treated is selected such that the level of the bed of catalyst in channel 90, when evenly distributed about the channel, is not above the upper extremity of the channel 90.

Depending upon the catalyst particle size, appropriate sized mesh screens 162 are selected and inserted into exhaust outlets 158. The assembly of lid 24 and cap 86 is then fastened to tub 20 with O-ring 22 being positioned to seal the joint between lid 24 and tub 20. As will be apparent to those of skill in the art, the lid 24 is positioned such that the optical axis of lenses 138 is aligned with the optical axis of the laser radiation from laser source 142.

Oxidizing gas inlets 146 and 150 are connected to a supply of oxidizing gas. The term "oxidizing gas" as used in this specification is intended to include a pure oxidizing gas and composite gas mixtures comprising an oxidizing gas. A non-limiting example of a suitable oxidizing gas is oxygen. In most applications, the use of pure oxygen is relatively hazardous due to its highly inflammable nature. Thus, it is preferred to use an oxidizing gas comprising from about 15 to about 25 weight percent of oxygen. A particularly preferred oxidizing gas is air, which typically comprises from about 20 to about 21 weight percent oxygen.

Exhaust outlets 158 are connected to an exhaust system and additional filtration may be provided to treat the exhaust gases, if desired. Thermocouple 166 is connected to an appropriate electronic instrument such as a meter or analog to digital signal converter for subsequent control processing.

When the catalyst has been loaded, lid 24 fastened to tub 20 and the gas connections made, motor 130 is activated to commence rotation of turntable 82 in the direction shown by arrow 176 (FIG. 4). Thereafter, the gas supply to the gas inlets 146 and 150 is set to an appropriate flow rate and the laser radiation source 142 is activated.

With reference to FIG. 5, the flow rate of oxidizing gas to gas jet 154 and the diameter of the jet 154 are selected so that the flow pattern, indicated by arrows 174, agitates the catalyst particles 178 in a cyclonic manner with the region of the reaction chamber 80 adjacent the jet 154. The torroidal shape of the reaction chamber 80 aids in the cyclonic mixing of the particles. It has been discovered that, when the catalyst material is particulate, cyclonic mixing provides relatively uniform exposure of the catalyst material to the laser radiation.

Preferably, the flow is selected so that the particles have settled within the reaction chamber 80 before they reach the zone under tower 98 wherein they are exposed to the laser radiation, indicated by arrows 180. Other methods of agitating the catalyst will also be apparent to those of skill in the art and may be employed, including but not limited to vibrating the catalyst, mechanical stirrers and mixers or fluidized bed techniques.

The flow rate of gas 148 through inlet 146 in turret 134 is also selected to inhibit catalyst particles or other debris from contacting the underside of lenses 138 to prevent damage thereto and to help settle the particles 178 in the zone of reaction chamber 80 under tower 98 as illustrated in FIG. 6.

Lenses 138 are selected in a known manner to provide a focal point for the laser energy from laser source 142 substantially at the surface of the bed of catalyst material. As will be apparent to those of skill in the art, lenses 138 may be spherical or cylindrical lenses to produce a circular or elliptical radiation exposure zone beneath tower 98, as desired.

Exhaust gas, indicated by arrows 183 in FIG. 7, which may comprise unreacted oxidizing gas, coke combustion products and/or hydrocarbon combustion products is exhausted from reaction chamber 80 through exhaust outlet 158.

As will be understood by those of skill in the art, the control of the amount of laser radiation, the gas flow rates and the turntable rotation rate can be effected in any one of several appropriate manners. For example, a computer-based controller can be used to monitor the output of the laser source and the temperature in the reaction chamber, as measured by the thermocouple, and to vary the speed of stepper motor 130 as required.

Figure 8:
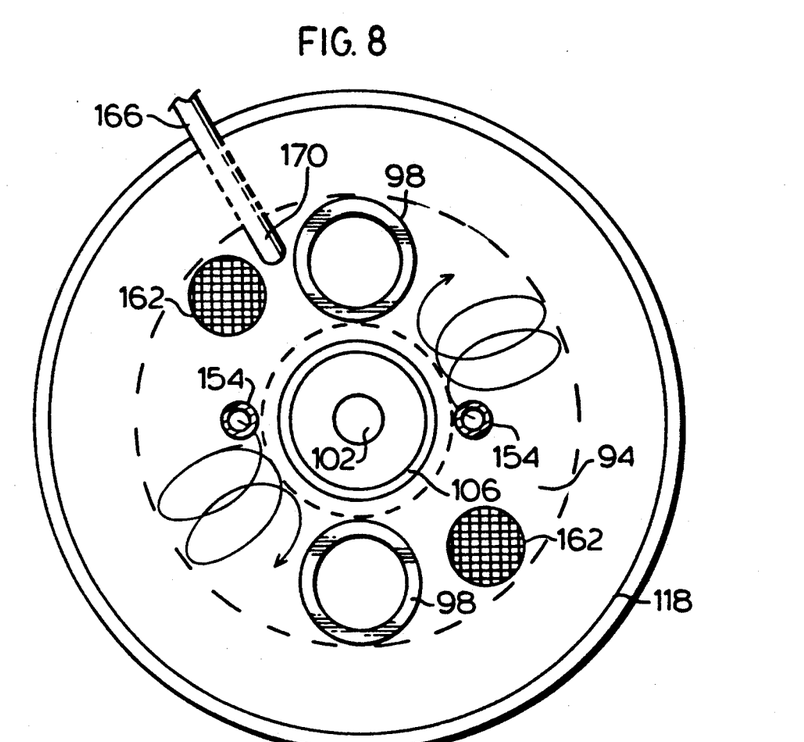
FIG. 8 illustrates a bottom plan view in the direction of arrows 8 in FIG. 4.
Figure 9:
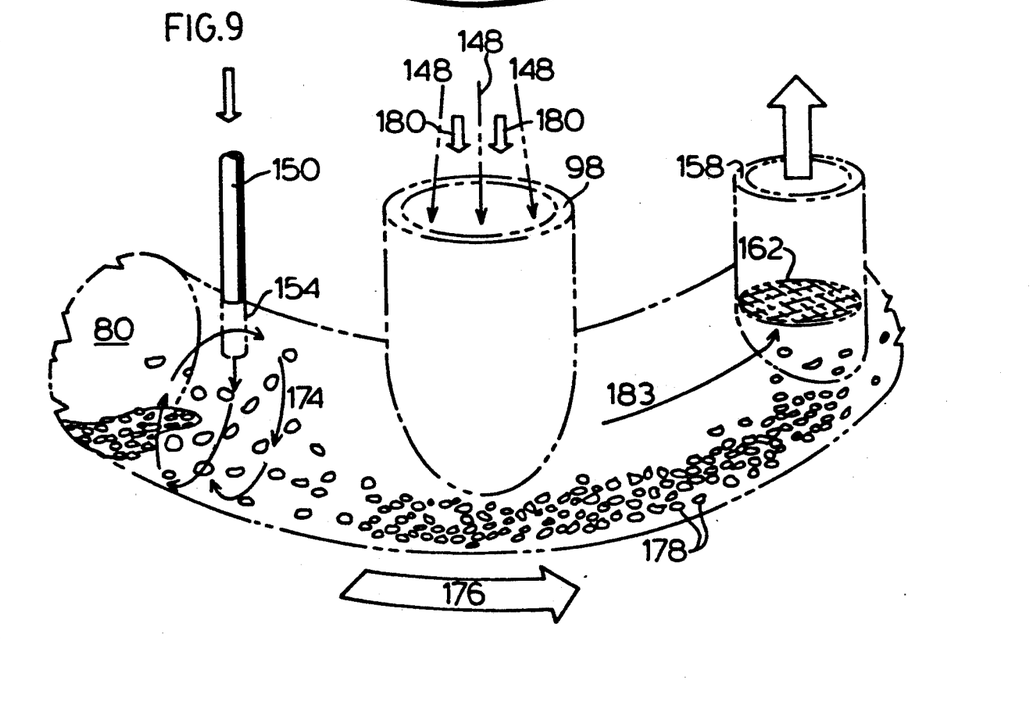
FIG. 9 illustrates a cut away view of a portion of the reactor chamber in the reactor of FIG. 1.

FIGS. 8 and 9 illustrate the agitation, exposure and exhaust zones within a processing stage of the reactor vessel. It will be understood by those of skill in the art that while the preferred embodiment of the present invention is shown as a batch processing operation, the reactor need not be so limited. It is contemplated that a continuous processing system could be provided by including a loading mechanism before, and an unloading mechanism after, one or more processing stages.

Figure 10:
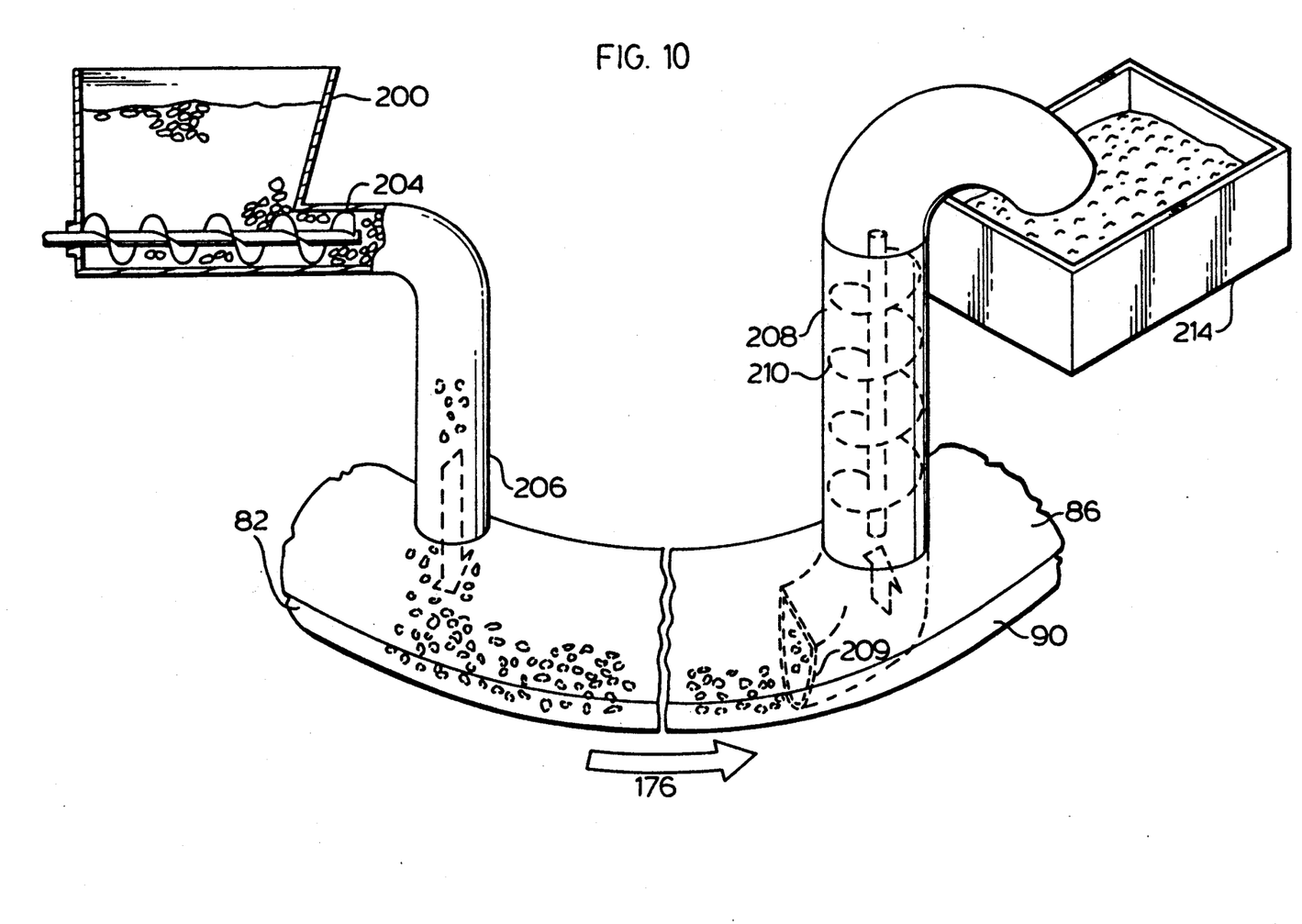
FIG. 10 illustrates a reactor chamber which has been modified for continuous operation.

An example of the reactor vessel as modified for continuous processing is illustrated in FIG. 10. A hopper 200 and screw 204 are provided for introducing unprocessed catalyst material into the reaction chamber 80 at an appropriate rate through a catalyst entry conduit 206. An unloading port 208 is spaced apart from entry conduit 206, after one or more processing stages and includes a scoop 209, which extends down from cap 86 and is thus fixed with respect to turntable 82, and an screw 210. Scoop 209 is shaped in a complementary manner to and engages the surface of channel 90.

As turntable 82 is rotated, unprocessed catalyst material is introduced through entry conduit 206 and is rotated through one or more processing stages. After the catalyst material has been rotated through a final processing stage, the rotation of turntable 82 causes the catalyst material to collect at and enter the shovel portion 209 of unloading port 208. Screw 210 within conduit 208 lifts the processed catalyst material out of reaction chamber 80 and into a processed catalyst storage vessel 214.

As will be readily understood by those skilled in the art, channel 90 may be modified for use with a catalyst material which is not in particulate form. For example, if the catalyst material is in the form of substrate plates coated with a catalyst, channel 90 may be modified to receive the plates with the catalyst bearing surface facing toward cap 86. It will be apparent that in this embodiment, agitation means for the catalyst material is optional.

We claim:

1. A reactor for processing a catalyst material comprising:
    a reaction chamber including support means for the catalyst material;
    at least one laser radiation entry means in communication with said reaction chamber to permit laser radiation to enter said reaction chamber at a first zone thereof and impinge on said support means;
    at least one gas inlet in communication with said reaction chamber and permitting entry of an oxidizing gas into said reaction chamber;
    at least one exhaust outlet in communication with said reaction chamber at a second zone thereof different from said first zone and permitting removal of an exhaust gas from said reaction chamber; and
    drive means connected to said support means and operable to provide relative movement between said support means and the laser radiation entry means to allow said support means to be positioned in one of said zones.

2. The reactor defined in claim 1, wherein said reaction chamber is annular.

3. The reactor defined in claim 2, wherein said reaction chamber is comprises an upper portion and a lower portion in detachable engagement.

4. The reactor defined in claim 2, wherein said drive means is connected to said lower portion in a manner such that said relative movement comprises rotation about the center of said annulus.

5. The reactor defined in claim 4, further comprising agitation means for agitating the catalyst material in the reaction chamber.

6. The reactor defined in claim 5, wherein said agitation means comprises a jet connected to said at least one gas inlet.

7. The reactor defined in claim 5, comprising a first gas inlet and a second gas inlet, wherein said agitation means is a jet connected to said first gas inlet and said second gas inlet is coterminous with said laser radiation entry means.

8. The reactor defined in claim 6, wherein said reaction chamber is torroidal.

9. The reactor defined in claim 5, wherein said laser radiation entry means and said at least one gas inlet are coterminous.

10. The reactor defined in claim 1, wherein said laser radiation entry means and said gas inlet are coterminous.

11. The reactor defined in claim 4, wherein said drive means operates in a stepwise manner.

12. The reactor defined in claim 5, wherein said exhaust outlet includes at least one filter to substantially prevent the catalyst material from traversing said exhaust outlet.

13. The reactor defined in claim 1, wherein said reaction chamber is enclosed within a substantially airtight vessel.

14. The reactor defined in claim 1, wherein adjacent combinations of said at least one gas inlet, said at least one entry means and said at least one exhaust outlet constitute a processing stage, said reactor including a plurality of said stages.

15. The reactor defined in claim 13, further comprising catalyst introduction means for introducing unprocessed catalyst material into said reaction chamber at a predetermined rate and catalyst removal means for removing processed catalyst material from said reaction chamber.

16. The reactor defined in claim 1, further comprising temperature sensing means within a portion of said reaction chamber.

* * * * *